United States Patent
Zhang

(10) Patent No.: US 10,235,964 B2
(45) Date of Patent: Mar. 19, 2019

(54) SPLICING DISPLAY SYSTEM AND DISPLAY METHOD THEREOF

(71) Applicant: BOE TECHNOLOGY GROUP CO., LTD., Beijing (CN)

(72) Inventor: Kailiang Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/519,248

(22) PCT Filed: Oct. 24, 2016

(86) PCT No.: PCT/CN2016/103008
§ 371 (c)(1),
(2) Date: Apr. 14, 2017

(87) PCT Pub. No.: WO2017/113951
PCT Pub. Date: Jul. 6, 2017

(65) Prior Publication Data
US 2018/0018931 A1   Jan. 18, 2018

(30) Foreign Application Priority Data
Dec. 31, 2015 (CN) .......................... 2015 1 1031020

(51) Int. Cl.
*G09G 5/00* (2006.01)
*G06F 3/14* (2006.01)
(Continued)

(52) U.S. Cl.
CPC .............. *G09G 5/005* (2013.01); *G06F 3/14* (2013.01); *G06F 3/1431* (2013.01);
(Continued)

(58) Field of Classification Search
None
See application file for complete search history.

(56) References Cited

U.S. PATENT DOCUMENTS

2009/0015513 A1   1/2009   Kim et al.
2011/0210975 A1   9/2011   Wong et al.

FOREIGN PATENT DOCUMENTS

CN   101256762 A   9/2008
CN   101404151 A   4/2009
(Continued)

OTHER PUBLICATIONS

Search Report and Written Opinion dated Jan. 25, 2017 from State Intellectual Property Office of the P.R. China.

*Primary Examiner* — Vu Nguyen
(74) *Attorney, Agent, or Firm* — Dilworth & Barrese, LLP.; Michael J. Musella, Esq.

(57) ABSTRACT

A splicing display system and a display method thereof are provided. The system includes a plurality of display units; a memory configured to store an image signal inputted into the splicing display system; and a controller configured to read each frame of image in the image signal sequentially from the memory through a first transmission interface between the controller and the memory, perform image processing on each frame of image, and transmit a sub-image corresponding to the display unit in each frame of image to each display unit. Each display unit includes a memory module connected with a display screen in the display unit and configured to store the sub-images corresponding to the display unit outputted by the controller. The controller is also configured to control the memory modules to synchronously output the sub-images corresponding to the display units in each frame of image to the display screens.

20 Claims, 5 Drawing Sheets

(51) Int. Cl.
  *G09G 5/10*    (2006.01)
  *G09G 5/12*    (2006.01)
  *H04N 5/268*   (2006.01)
  *G09G 5/397*   (2006.01)
  *G06T 3/40*    (2006.01)

(52) U.S. Cl.
  CPC ............ *G06F 3/1446* (2013.01); *G09G 5/10* (2013.01); *G09G 5/12* (2013.01); *G09G 5/397* (2013.01); *H04N 5/268* (2013.01); *G06T 3/40* (2013.01); *G09G 2300/026* (2013.01); *G09G 2320/066* (2013.01); *G09G 2340/04* (2013.01); *G09G 2340/0407* (2013.01); *G09G 2340/0442* (2013.01); *G09G 2340/14* (2013.01); *G09G 2360/04* (2013.01); *G09G 2360/12* (2013.01); *G09G 2370/12* (2013.01)

(56) References Cited

FOREIGN PATENT DOCUMENTS

| CN | 101615108 A | 12/2009 |
|---|---|---|
| CN | 102857738 A | 1/2013 |
| CN | 103065551 A | 4/2013 |
| CN | 103135956 A | 6/2013 |
| CN | 104407464 A | 3/2015 |
| CN | 104750451 A | 7/2015 |
| CN | 105653224 A | 6/2016 |

SPLICING DISPLAY SYSTEM AND DISPLAY METHOD THEREOF

TECHNICAL FIELD

Embodiments of the present disclosure relate to a splicing display system and a display method thereof.

BACKGROUND

As it is difficult to directly manufacture ultra-large-size display devices, ultra-large-size splicing display systems required in various situations, such as shopping malls, exhibition halls and entertainment places, are obtained by splicing a plurality of small-size display screens with same dimension according to certain arrangement mode.

A controller of the splicing display system is required to acquire a dynamic image signal through transmission interfaces, and then synchronously display various parts of each frame of image on corresponding display screens, so as to completely display each frame of image. The transmission interface of the controller is usually a high definition multimedia interface (HDMI), or a digital visual interface (DVI). The band width (referring to the data transmission capability, namely the amount of data that can pass through the link per unit time) of one transmission interface can only transmit full high definition (FHD, with the resolution of 1920×1080) image signals with low transmission resolution and cannot transmit image signals of 4 k (with the resolution of 4096×2160) or more with high transmission resolution.

SUMMARY

Embodiments of the present disclosure provide a splicing display system and a display method thereof.

According to an embodiment of the present disclosure, a splicing display system is provided. The splicing display includes: a plurality of display units, each display unit including a display screen; a memory configured to store an image signal inputted into the splicing display system; and a controller configured to read each frame of image in the image signal in turn from the memory through an output interface between the controller and the memory, perform image processing on each frame of image, and transmit a sub-image corresponding to the display unit in each frame of image to each display unit. Each display unit further includes: a memory module connected with the display screen in the display unit and configured to store the sub-image corresponding to the display unit outputted by the controller; and the controller is also configured to control the memory modules to synchronously output the sub-images corresponding to the display units in each frame of image to the display screens.

For example, the controller includes: a signal reading device configured to read each frame of image in the image signal in turn; a signal processing device configured to stretch or shrink each frame of image when the resolution of each frame of image is less than or greater than the total display resolution, so as to obtain each frame of the displaying image of which the resolution is the same as the total display resolution, the total display resolution being equal to the sum of the display resolution of the display screens; and a signal splitting device configured to split each frame of display image into a plurality of sub-images corresponding to the display units, or configured to split each frame of image into a plurality of sub-images corresponding to the display units when the resolution of each frame of image is equal to the total display resolution, the total display resolution being equal to the sum of the display resolution of the displays.

For example, the controller further includes a contrast increasing device configured to increase the contrast of each frame of display image obtained after stretching treatment.

For example, the resolution of each frame of image is equal to the total display resolution if the splicing display system includes one row and a plurality of columns, or a plurality of rows and one column of display units.

For example, the memory includes a universal serial bus (USB) flash disk, or a secure digital (SD) memory card.

For example, the memory modules are connected with the display screens in the display units through transmission interfaces.

For example, the transmission interfaces include low voltage differential signaling (LVDS) interfaces, or V-by-One (V×1) interfaces.

For example, the memory module includes a double-data-rate three synchronous dynamic random access memory (DDR3).

According to an embodiment of the present disclosure, a display method for a splicing display system is provided. The splicing display system includes: a plurality of display units. Each display unit includes a display screen and a memory module connected with the display; a memory and a controller. The display method includes: the controller reading each frame of image in an image signal in turn from the memory through an output interface between the controller and the memory; performing image processing on each frame of image; transmitting a sub-image corresponding to the display unit in each frame of image to the memory module in each display unit; and controlling the memory modules to synchronously output the sub-images corresponding to the display units in each frame of image to the display screens.

For example, the method further includes stretching or shrinking each frame of image when the resolution of each frame of image is less than or greater than the total display resolution, so as to obtain each frame of the displaying image of which the resolution is the same as the total display resolution, the total display resolution being equal to the sum of the display resolution of the displays; and splitting each frame of display image into a plurality of sub-images corresponding to the display units, or splitting each frame of image into a plurality of sub-images corresponding to the display units when the resolution of each frame is equal to the total display resolution, the total display resolution being equal to the sum of the display resolution of the display screens.

For example, the method further includes increasing the contrast of each frame of display image obtained after stretching treatment.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions according to the embodiments of the present disclosure will be described clearly and fully as below in conjunction with the accompanying drawings of embodiments of the present disclosure. It is apparent that the described embodiments are just a part but not all of the embodiments of the disclosure. Based on the described embodiments herein, a person of ordinary skill in the art can obtain other embodiment(s), without any creative work, which shall be within the scope of the present disclosure.

It is noted that all the terms (including technical and scientific terms) used in the embodiments of the present disclosure have the same meaning commonly understood by those skilled in the art. It is also understood that those terms defined in the usual dictionary shall be construed as the meanings consistent with their meanings in the context of the relevant technology of the specification, and shall not be construed as idealized or extremely formalized meanings, unless otherwise defined herein.

Figure 1:
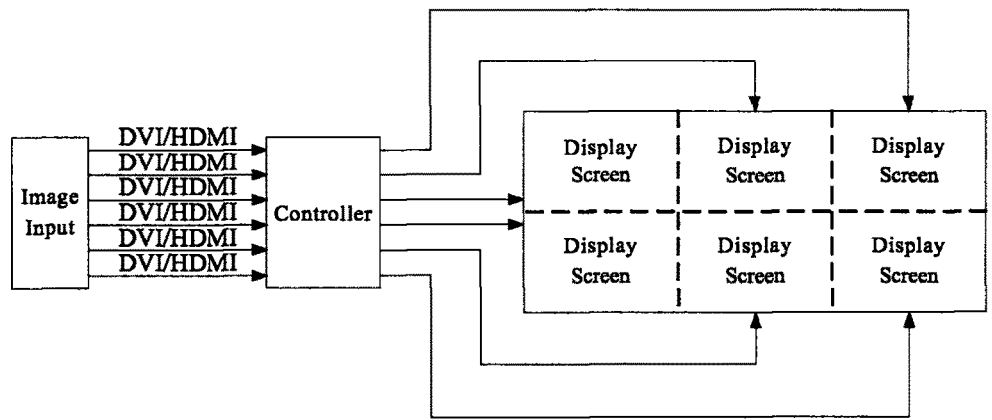
FIG. 1 is a block diagram of a configuration of a splicing display system.

As illustrated in FIG. 1, taking the case that a splicing display system includes 6 display screens as an example, a controller is required to synchronously receive various parts corresponding to the 6 display screens in each frame of image from an image output source through 6 transmission interfaces (DVIs/HDMIs are shown in the figure) having the same number as the spliced display screens, and synchronously output various parts of each frame of image to corresponding display screens, so that each frame of image can be completely and dynamically displayed on the 6 displays. Thus, hardware connection in the controller of the splicing display system is complex. Moreover, along with the increased number of the spliced display screens in the splicing display system, high definition (HD) images can only be completely displayed when more transmission interfaces are disposed on the controller correspondingly, so the connection of input terminals of the controller can be more complicated.

Figure 2:
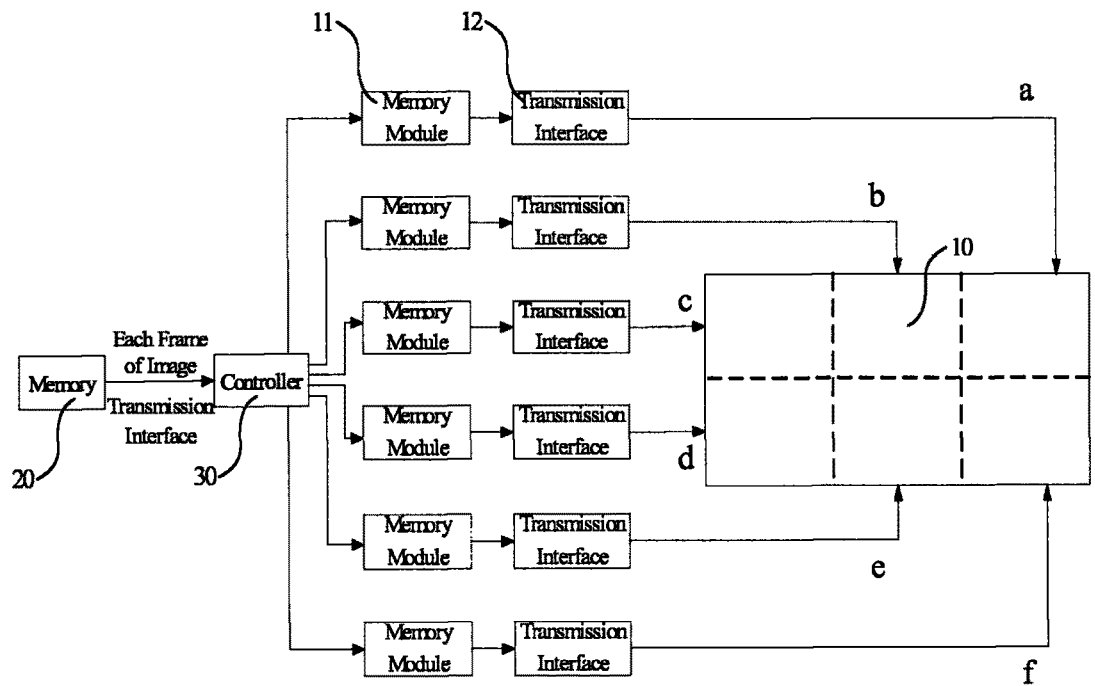
FIG. 2 is a block diagram of a configuration of a splicing display system provided by an embodiment of the present disclosure.

As illustrated in FIG. 2, an embodiment of the present disclosure provides a splicing display system. The splicing display system includes a plurality of display units (the figure only takes 2 row×3 column, that is, 6 display units in total, as an example, however, the embodiments of the present disclosure are not limited thereto). Each display unit includes a display 10; a memory 20 configured to store an image signal inputted into the splicing display system; and a controller 30 configured to read each frame of image in the image signal in turn from the memory 20 through one transmission interface between the controller and the memory 20, perform image processing on each frame of image, and transmit a sub-image (the sub-images are represented by "a" to "f" in turn in the figure) corresponding to the display unit in each frame of image to each display unit. Each display unit further includes: a memory module 11 connected with the display 10 in the display unit and configured to store the sub-image corresponding to the display unit outputted by the controller 30. The controller 30 is also configured to control the memory modules 11 to synchronously output the sub-images corresponding to the display units in each frame of image to the displays 10.

It is noted that the memory 20 refers to any memory device having information storage function, for instance, it may include: a USB (Universal Serial BUS) flash disk, a SD (Secure Digital) memory card or a buffer memory, and users can replace the content displayed by the splicing display system by updating the content stored in the memory 20 or replacing the memory 20.

For instance, a 8K×4K ultra-high-definition (UHD) image occupies about 100 MB memory space, and a 32 GB USB flash disk may store 300 UHD images of 8K×4K. In this way, the display requirements of most users on the splicing display system can be fully satisfied.

The memory module 11 has same functions as the memory 20 and is also a memory device capable of storing information, for instance, may be a DDR3 memory (Double-Data-Rate Three Synchronous Dynamic Random Access Memory).

Moreover, the memory module 11 may be connected with the display 10 in the display unit through a transmission interface 12, so as to transmit the sub-image corresponding to the display unit in each frame of image to each display unit.

Herein, the transmission interface 12, for instance, may include: an internal interface, such as an LVDS (Low Voltage Differential Signaling) interface, or a V×1 interface (namely "V-by-One" high-speed serial interface (HSSI), which mainly transmits data through a pair of differential signals, and it is a digital interface standard developed special for image transmission), namely the memory module 11 is integrated with a drive circuit of the display 10 in the display unit, and the image transmission is achieved through an internal interface of an integrated circuit.

The data transmission mode between the controller 30 and the memory modules 11 may refer to FIG. 2, namely the controller 30 synchronously stores the sub-images corresponding to the display units in each frame of image into the memory modules 11 through the transmission interfaces having the same number as the display units. This transmission mode is applicable to the case that the number of the display units of the splicing display system is numerous. Data may be inputted into the memory modules 11 of the plurality of display units at the same time, which will not take up too much time before display; or, the controller 30 may output data to the memory modules 11 of the display units in turn through a single transmission interface. This transmission mode is applicable to the case that the number of the display units in the splicing display system is small, which does not require arranging numerous interfaces between the controller 30 and the display units.

Taking the case that the memory 20 is a USB flash disk or a SD memory card as an example, the band width of the USB flash disk or the SD memory card cannot satisfy the requirement of transmitting images with high resolution of more than 4K. The controller 30 in an embodiment of the present disclosure continuously reads image information from the memory 20 through one transmission interface between the controller and the memory 20, performs image processing after obtaining one frame of complete high-resolution image, and subsequently respectively transmits the processed images to the memory modules 11 corresponding to the displays 10.

To allow the display 10 to synchronously and dynamically display frames of continuous and complete image, the memory module 11 may synchronously output sub-images corresponding to the display units in each frame of image to the displays 10 by a variety of ways. For instance, the memory 20 may transmit the sub-images corresponding to the display units in each frame of the processed image to the memory modules 11 after reading a frame of complete image; after the memory 20 reads all of the frames of images in turn, namely the memory modules 11 store a plurality of sub-images corresponding to the display units in all of the frames of images, and under the control of a same clock signal of the controller 30, the memory modules 11 are controlled to synchronously output the sub-images corresponding to the display units in each frame of image to the display screens 10, so that the frames of complete image can be continuously displayed on the display screens 10. Alternately, the memory 20 reads partial frames of an image in turn at first, processes the partial frames of the image, and sequentially transmits the partial frames of the image to the memory modules 11; and subsequently, under the control of a same clock signal of the controller 30, the memory modules 11 are controlled to synchronously output the sub-images corresponding to the display units in each frame of the image to the displays 10. Moreover, when the display screens of the display units display, the memory 20 reads the remaining frames of the image in turn, processes the remaining frames of the image, and sequentially transmits the remaining frames of the image to the memory modules 11; and subsequently, under the control of a same clock signal of the controller 30, the memory modules 11 are controlled to synchronously output the sub-images corresponding to the display units in each frame of the image among the remaining frames to the displays 10. The number of the partial frames read firstly by the memory 20 may be selected, so that the display screens 10 can continuously display the frames of a complete image according to the time interval between one frame of the image and next frame of the image in the image signal stored in the memory 20.

In the splicing display system provided by the embodiment of the present disclosure, a user can obtain different image signals by updating the content stored in the memory 20 or replacing the memory 20. The controller 30 reads each frame of image in the image signal in turn from the memory 20 through one transmission interface between the controller and the memory 20. For instance, a memory device, such as a USB flash disk, or a SD memory card, may be inserted into a circuit board of the controller 30, and the content required to be displayed by the entire splicing display system may be outputted, so that the connection of input terminals of the controller can be simplified, and the problem of complex hardware connection of the controller caused by insufficient band width of the transmission interface can be solved. Moreover, the controller 30 correspondingly transmits the sub-images corresponding to the display units in each frame of a processed image to the memory modules 11 of the display units, and the memory modules 11 in the display units are utilized to jointly store each frame of an image in the image signal; and under the control of a same clock signal, the memory modules 11 are driven to synchronously output the sub-images corresponding to the display units in each frame of image to the display screens 10, so that the display screens 10 can synchronously display the frames of a complete and continuous image.

Detailed description will be given below to the functions of the configuration units in the splicing display system by taking the following as an example: the splicing display system includes m row×n column display units 10; the display resolution of each display screen 10 is a column×b row; and the total display resolution of the splicing display system is (n×a) column×(m×b) row, where the parameters m, n, a and b are all positive integers, and the product of m and n is greater than or equal to 2.

Figure 3:
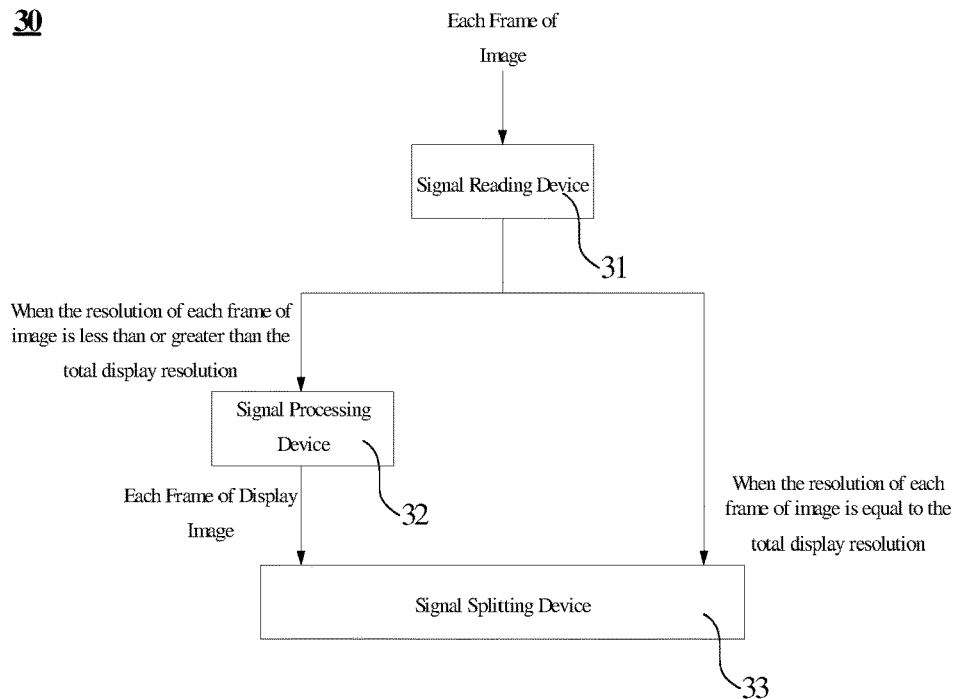
FIG. 3 is a block diagram 1 of a controller in the splicing display system provided by an embodiment of the present disclosure.

As shown in FIG. 3, the controller 30 includes: a signal reading device 31 configured to read each frame of image in the image signal in turn; a signal processing device 32 configured to stretch or shrink each frame of image when the resolution of each frame of image is less than or greater than the total display resolution, so as to obtain each frame of the displaying image of which the resolution is the same as the total display resolution, in which the total display resolution is equal to the sum of the display resolution of the display screens 10; and a signal splitting device 33 configured to split each frame of display image into a plurality of sub-images corresponding to the display units, or configured to split each frame of image into a plurality of sub-images corresponding to the display units when the resolution of each frame of image is equal to the total display resolution, in which the total display resolution is equal to the sum of the display resolution of the display screens 10.

It is noted that the display resolution of a single display is the physical resolution of the screen, refers to the number of pixels that can be displayed by the display screen, which represents the fineness of an image that can be displayed by the display.

The total display resolution of the splicing display system refers to the product of the sum of the number of pixels per column and the sum of the number of pixels per row, namely (n×a) column×(m×b) row. Taking the case that the splicing display system includes 2 row×3 column display units and the display resolution of the display screen 10 of each display unit is 1920 column×1080 row as an example, the total display resolution of the splicing display system formed by the 6 display units is 5760 column×2160 row.

Taking the case that the display resolution of a single display is FHD (namely including 1920 column×1080 row pixels) as an example, to allow each display to directly display a sub-image after receiving a corresponding sub-image without a stretching or shrinking treatment on pixels of the sub-image, the resolution of the sub-image of which the resolution is the same as the display resolution of the display, transmitted by the controller 30 to each display unit, is also 1920 column×1080 row.

Figure 4:
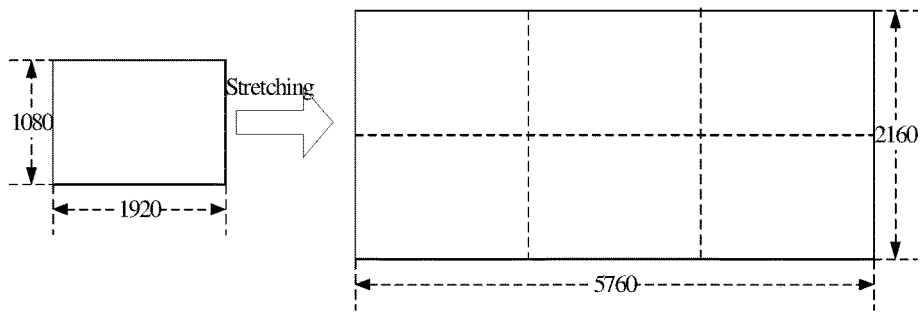
FIG. 4 is a schematic diagram illustrating the stretching of the image resolution of a signal source in the splicing display system provided by an embodiment of the present disclosure.

The signal processing device 32 has the function of stretching or shrinking each frame of image, so as to obtain each frame of the displaying image of which the resolution is the same as the total display resolution. Again, taking the case that the total display resolution of the splicing display system is 5760 column×2160 row as an example, as shown in FIG. 4, when the resolution of each frame of image in the image signal is less than 5760 column×2160 row, for instance, 1920 column×1080 row, the pixels of each frame of image in the image signal must be stretched, so that both the number of pixels per column and the number of pixels per row of each frame of image in the image signal can be the same as the number of pixels per column and the number of pixels per row of the total display resolution of the splicing display system.

When the resolution of each frame of image in the image signal is greater than the total display resolution, the pixels in each frame of image are shrunk, so as to obtain each frame of the displaying image of which the resolution is the same as the total display resolution. Herein, each frame of display image of which the resolution is the same as the total display resolution can be obtained by removing partial pixels.

For instance, only those parts, of which the resolution is the same as the total display resolution, in one frame of image are read, and the exceeding parts are removed and not read. The exceeding parts may be selected to be at least one of the upper side, lower side, left side or right side of each frame of image. As the visual focus is usually concentrated in the middle of the image when the human eyes are viewing the image, and areas on the upper, lower, left and right sides of the image tend to be ignored, the removal of pixels at these areas has little effect for a user to understand the overall meaning of a frame of image; or the original screen size of each frame of image may be retained, but one row or one column of pixels are removed at an interval of one row, or one column, so that the resolution of each frame of an adjusted image can be the same as the total display resolution. As the dimension of one row or one column of pixels is very small, the removal of one row or one column of pixels at an interval of one row or one column has little effect on the viewing effect of the user.

Herein, when the number of the display units in the splicing display system is gradually increased, the total display resolution of the splicing display system is also correspondingly increased, and normally, the resolution of each frame of image in the image signal will not be greater than the total display resolution of the splicing display system. The signal processing device 32 is usually configured to stretch each frame of image when the resolution of each frame of image in the image signal is less than the total display resolution.

Figure 5:
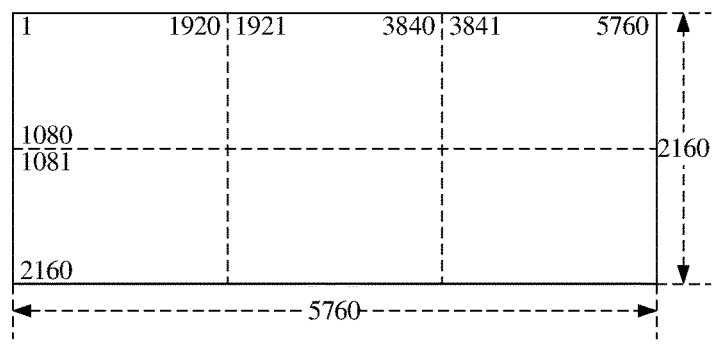
FIG. 5 is a schematic diagram illustrating the splitting of an image of the signal source in the splicing display system provided by an embodiment of the present disclosure.

When the resolution of each frame of image obtained after being processed by the signal processing device 32 is 5760 column×2160 row, or the resolution of each frame of image read by the signal reading device 31 is 5760 column×2160 row, as shown in FIG. 5, the signal splitting device 33 (not shown in the figure) is configured to split each frame of image with the resolution of 5760 column×2160 row, and obtain 6 split units corresponding to the arrangement mode of the display units, and the image resolution of each split unit is 1920 column×1080 row.

Figure 6A:
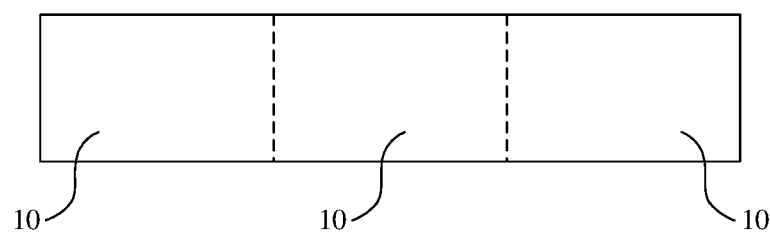
FIG. 6a is an arrangement mode 1 of the splicing display system provided by an embodiment of the present disclosure.

In this way, as shown in FIG. 6a, if m is 1, namely the splicing display system includes 1 row and a plurality of columns of display units, as the splicing display system having this arrangement mode has large difference in display scale, only image signals in which the resolution of each frame of image is equal to the total display resolution are inputted into the splicing display system, namely the resolution of each frame of image in the image signal is (n×a) column×b row.

Herein, taking the case that n is 3 as an example, as for the splicing display system formed by 1 row×3 column display units, when the display resolution of the display screen 10 of each display unit is 1920 column×1080 row, the splicing display system only supports image signals of which the image resolution is 5760 column×1080 row.

Figure 6B:
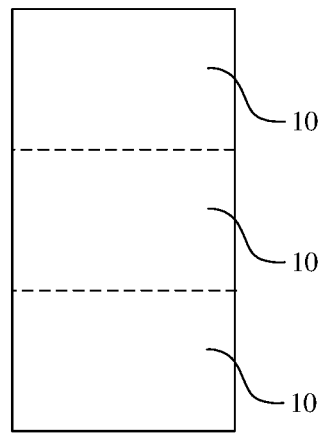
FIG. 6b is an arrangement mode 2 of the splicing display system provided by an embodiment of the present disclosure.

Likewise, as shown in FIG. 6b, if n is 1, namely the splicing display system includes a plurality of rows and one column display units, as the splicing display system having this arrangement mode has large difference in display scale, only image signals in which the resolution of each frame of image is equal to the total display resolution are inputted into the splicing display system, namely the resolution of each frame of image in the image signal is a column×(m×b) row.

Herein, taking the case that m is 3 as an example, for the splicing display system formed by 3 row×1 column display units, when the display resolution of the display screen 10 of each display unit is 1920 column×1080 row, the splicing display system only supports image signals of which the image resolution is 1920 column×3240 row.

Figure 7:
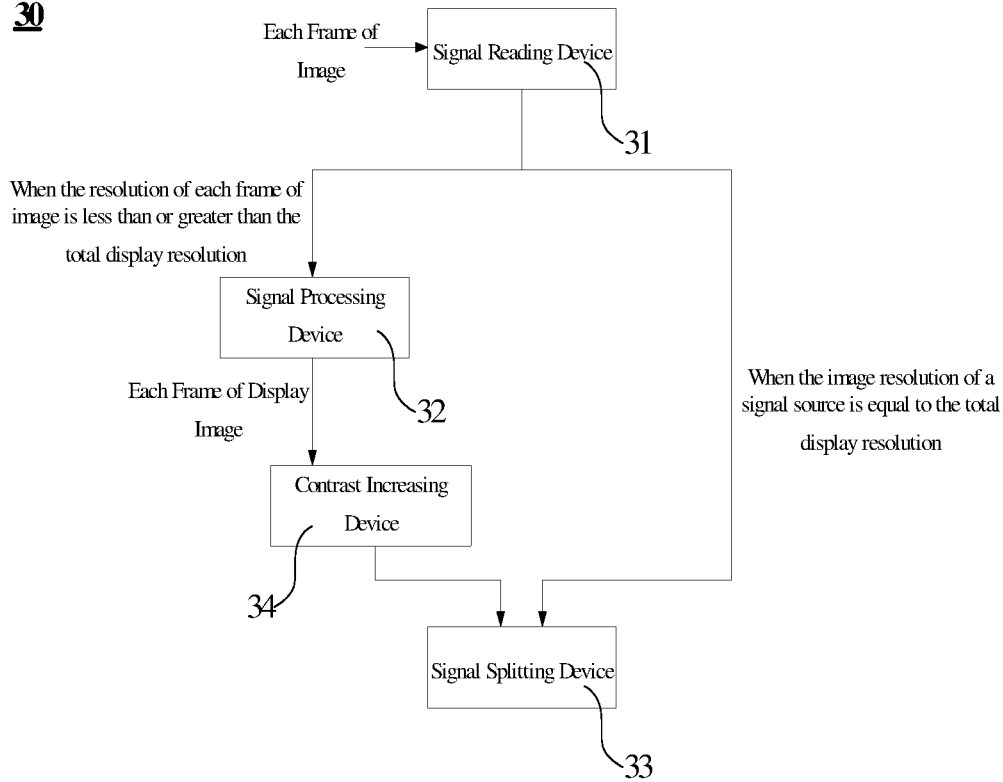
FIG. 7 is a block diagram 2 of the controller in the splicing display system provided by an embodiment of the present disclosure.

Moreover, for instance, as the contrast of the image will be reduced after each frame of image is stretched when the resolution of each frame of image in the image signal is less than the total display resolution of the splicing display system, the final display quality of the splicing display system can be affected, for instance, as shown in FIG. 7, the controller 30 further includes a contrast increasing module 34 configured to increase the contrast of each frame of display image obtained after image stretching.

Figure 8:
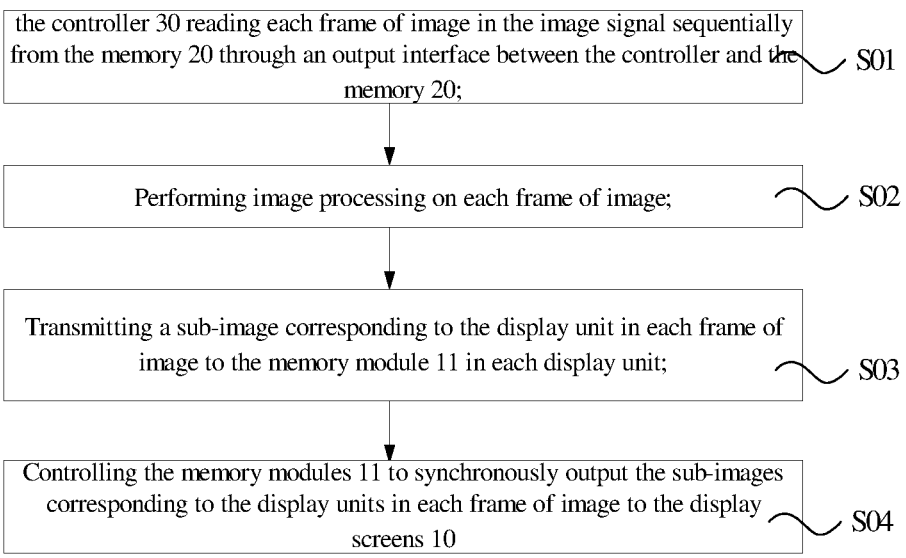
FIG. 8 is a flow diagram of a display method for a splicing display system, provided by an embodiment of the present disclosure.

An embodiment of the present disclosure also provides a display method for the splicing display system. The splicing display system includes a plurality of display units, in which each display unit includes: a display screen 10; a memory module 11 connected with the display screen 10; a memory 20; and a controller 30. As illustrated in FIG. 8, the display method includes following steps.

S01: the controller 30 reading each frame of image in the image signal in turn from the memory 20 through an output interface between the controller and the memory 20;

S02: performing image processing on each frame of image;

S03: transmitting a sub-image corresponding to the display unit in each frame of image to the memory module 11 in each display unit; and S04: controlling the memory modules 11 to synchronously output the sub-images corresponding to the display units in each frame of image to the display screens 10.

In this way, the splicing display system provided by the embodiment of the present disclosure can achieve the technical effect of UHD display by using the memory 20, such as the USB flash disk, or the SD memory card; and the simple controller 30.

Figure 9:
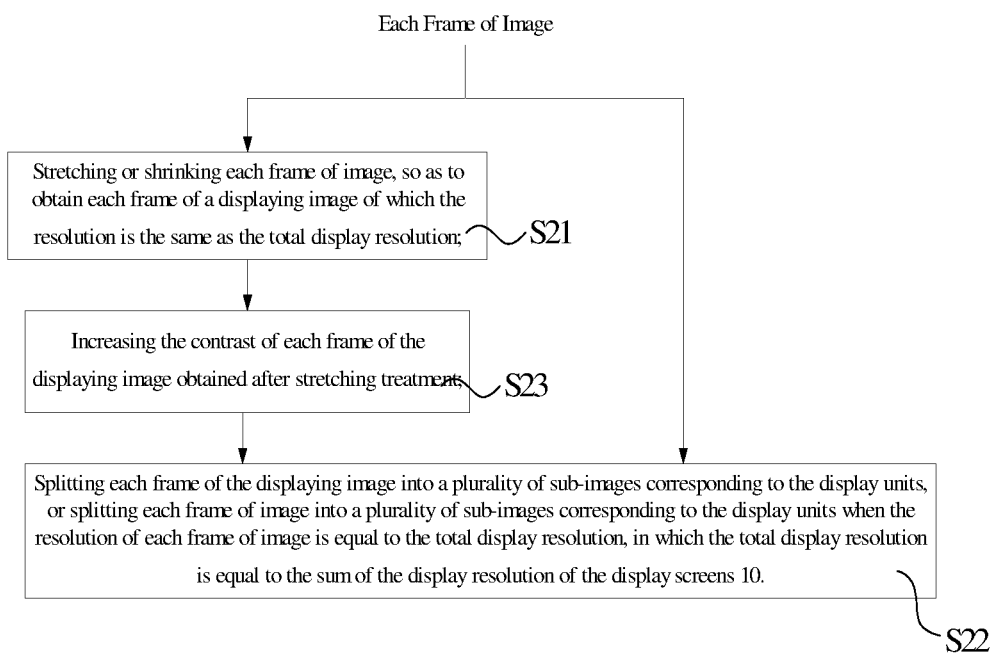
FIG. 9 illustrates the example steps of the step S02 in FIG. 8.

Moreover, for instance, as shown in FIG. 9, the step S02 may include the following steps.

S21: stretching or shrinking each frame of image when the resolution of each frame of image is less than or greater than the total display resolution, so as to obtain each frame of the displaying image of which the resolution is the same as the total display resolution, in which the total display resolution is equal to the sum of the display resolution of the displays 10;

S22: splitting each frame of display image into a plurality of sub-images corresponding to the display units, or splitting each frame of image into a plurality of sub-images corresponding to the display units when the resolution of each frame of image is equal to the total display resolution, in which the total display resolution is equal to the sum of the display resolution of the displays 10.

Herein, as the contrast of the image will be reduced after each frame of image is stretched when the resolution of each frame of image in the image signal is less than the total display resolution of the splicing display system, the final display quality of the splicing display system can be affected. For instance, when the step S21 includes the step of stretching each frame of image when the resolution of each frame of image is less than the total display resolution, before the subsequent step S22, the step S02 further includes S23: increasing the contrast of each frame of display image obtained after the stretching treatment.

It is noted that, as shown in FIG. 6a or 6b, in the case that the splicing display system includes 1 row and a plurality of columns, or a plurality of rows and 1 column display units, as the splicing display system having the arrangement mode has large difference in display scale, only image signals in which the resolution of each frame of image is equal to the total display resolution are inputted into the splicing display system, namely the subsequent step S22 is executed after the step S01.

In the splicing display system provided by the embodiment of the present disclosure, a user can obtain different image signals by updating the content stored in the memory or replacing the memory. The controller reads each frame of image in the image signal in turn from the memory through one transmission interface between the controller and the memory. For instance, a memory device, such as a USB flash disk, or a SD memory card, may be inserted into a circuit board of the controller, and the content required to be displayed by the entire splicing display system may be outputted, so that the connection of input terminals of the controller can be simplified, and the problem of complex hardware connection of the controller caused by insufficient band width of the transmission interface can be solved. Moreover, the controller correspondingly transmits the sub-images corresponding to the display units in each frame of processed image to the memory modules of the display units, and the memory modules in the display units are utilized to jointly store each frame of image in the image signal; and under the control of a same clock signal, the memory modules are driven to synchronously output the sub-images corresponding to the display units in each frame of image to the display screens, so that the display screens can synchronously display frames of a complete and continuous image.

It is noted that all the accompanying drawings of the present disclosure are brief schematic diagrams of the splicing display system and the display method thereof, which are only intended to clearly describe the structures relevant to the disclosure points embodied in the solutions, and they do not embody other conventional structures irrelevant to the disclosure points, or only embody parts.

The described above are only exemplary embodiments of the present disclosure, and the present disclosure is not intended to be limited thereto. For one of ordinary skill in the art, various changes and alternations may be made without departing from the technical scope of the present disclosure, and all of these changes and alternations shall fall within the scope of the present disclosure.

The application claims priority to the Chinese patent application No. 201511031020.6, filed on Dec. 31, 2015 and entitled "Splicing Display System and Display Method thereof," which is incorporated herein by reference in its entirety.

What is claimed is:

1. A splicing display system, comprising:
    a plurality of display units, each display unit including a display screen;
    a memory configured to store an image signal inputted into the splicing display system; and
    a controller configured to read each frame of image in the image signal in turn from the memory through a first transmission interface between the controller and the memory, perform image processing on each frame of image, and transmit a sub-image corresponding to the display unit in each frame of image to each display unit,
    wherein each display unit further includes: a memory module connected with the display screen in the display unit and configured to store the sub-image corresponding to the display unit outputted by the controller; and
    the controller is also configured to control the memory modules to synchronously output the sub-images corresponding to the display units in each frame of image to the display screens.

2. The splicing display system according to claim 1, wherein the controller includes:
    a signal reading device configured to read each frame of image in the image signal in turn;
    a signal processing device configured to stretch or shrink each frame of image when the resolution of each frame of image is less than or greater than the total display resolution, so as to obtain each frame of the displaying image of which the resolution is the same as the total display resolution, wherein the total display resolution is equal to the sum of the display resolution of the display screens; and
    a signal splitting device configured to split each frame of display image into a plurality of sub-images corresponding to the display units, or configured to split each frame of image into a plurality of sub-images corresponding to the display units when the resolution of each frame of image is equal to the total display resolution, wherein the total display resolution is equal to the sum of the display resolution of the displays.

3. The splicing display system according to claim 2, wherein the controller further includes: a contrast increasing device configured to increase the contrast of each frame of display image obtained after stretching treatment.

4. The splicing display system according to claim 3, wherein the resolution of each frame of image is equal to the total display resolution if the splicing display system comprises one row and a plurality of columns, or a plurality of rows and one column of display units.

5. The splicing display system according to claim 4, wherein the memory includes a universal serial bus (USB) flash disk, or a secure digital (SD) memory card.

6. The splicing display system according to claim 5, wherein the memory modules are connected with the display screens in the display units through second transmission interfaces.

7. The splicing display system according to claim 6, wherein the second transmission interfaces include low voltage differential signaling (LVDS) interfaces, or V-by-One (V×1) interfaces.

8. The splicing display system according to claim 7, wherein the memory module includes a double-data-rate three synchronous dynamic random access memory (DDR3).

9. The splicing display system according to claim 2, wherein the resolution of each frame of image is equal to the total display resolution if the splicing display system comprises one row and a plurality of columns, or a plurality of rows and one column of display units.

10. The splicing display system according to claim 9, wherein the memory includes a universal serial bus (USB) flash disk, or a secure digital (SD) memory card.

11. The splicing display system according to claim 10, wherein the memory modules are connected with the display screens in the display units through second transmission interfaces.

12. The splicing display system according to claim 11, wherein the second transmission interfaces include low voltage differential signaling (LVDS) interfaces, or V-by-One (V×1) interfaces.

13. The splicing display system according to claim 12, wherein the memory module includes a double-data-rate three synchronous dynamic random access memory (DDR3).

14. The splicing display system according to claim 1, wherein the memory includes a universal serial bus (USB) flash disk, or a secure digital (SD) memory card.

15. The splicing display system according to claim 1, wherein the memory modules are connected with the display screens in the display units through second transmission interfaces.

16. The splicing display system according to claim 15, wherein the second transmission interfaces include low voltage differential signaling (LVDS) interfaces, or V-by-One (V×1) interfaces.

17. The splicing display system according to claim 1, wherein the memory module includes a double-data-rate three synchronous dynamic random access memory (DDR3).

18. A display method for a splicing display system, wherein the splicing display system includes: a plurality of display units, in which each display unit includes a display screen and a memory module connected with the display; a memory and a controller; and the display method comprises:

the controller reading each frame of image in an image signal in turn from the memory through a first transmission interface between the controller and the memory;

performing image processing on each frame of image;

transmitting a sub-image corresponding to the display unit in each frame of image to the memory module in each display unit; and controlling the memory modules to synchronously output the sub-images corresponding to the display units in each frame of image to the display screens.

19. The display method according to claim 18, further comprising:

stretching or shrinking each frame of image when the resolution of each frame of image is less than or greater than the total display resolution, so as to obtain each frame of the displaying image of which the resolution is the same as the total display resolution, in which the total display resolution is equal to the sum of the display resolution of the displays; and splitting each frame of display image into a plurality of sub-images corresponding to the display units, or splitting each frame of image into a plurality of sub-images corresponding to the display units when the resolution of each frame is equal to the total display resolution, in which the total display resolution is equal to the sum of the display resolution of the display screens.

20. The display method according to claim 19, further comprising:

increasing the contrast of each frame of display image obtained after stretching treatment.

\* \* \* \* \*